UNITED STATES PATENT OFFICE.

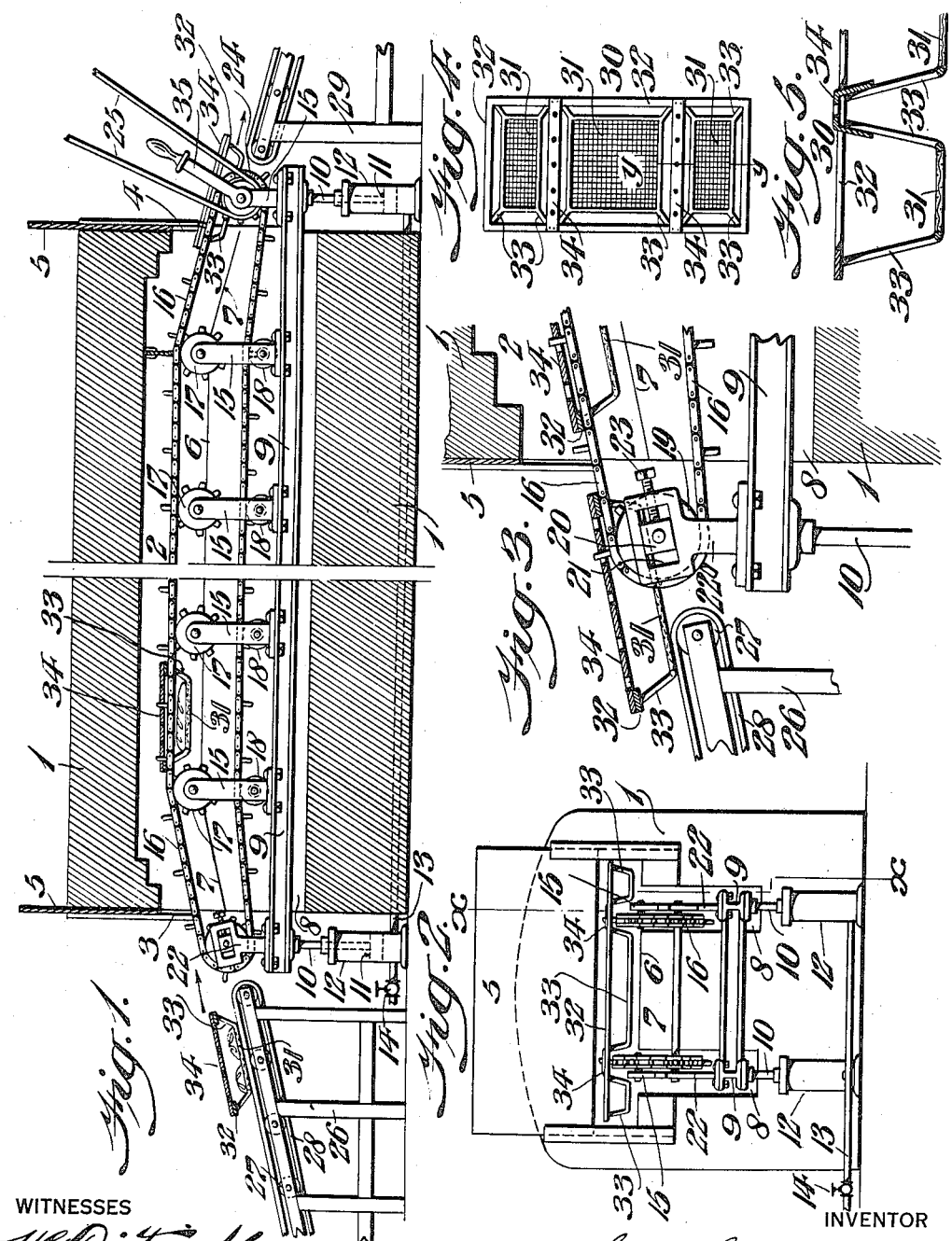

HUGO GOTTSCHALK, OF BURNHAM, PENNSYLVANIA, ASSIGNOR TO GOTTSCHALK AUTOMATIC BRICK OVEN COMPANY, INC., OF NEW YORK, N. Y., A CORPORATION OF NEW YORK.

METHOD OF BAKING HEARTH-BREAD.

1,151,356.  Specification of Letters Patent.  Patented Aug. 24, 1915.

Application filed January 14, 1915. Serial No. 2,133.

*To all whom it may concern:*

Be it known that I, HUGO GOTTSCHALK, a citizen of the United States, residing at Burnham, in the county of Mifflin, State of Pennsylvania, have invented a new and useful Method of Baking Hearth-Bread, of which the following is a specification.

This invention relates to a method for baking hearth bread and has for its object to support the loaves and carry them into an oven, to deposit the support upon the hearth of the oven to rest directly upon the same during the baking operation to elevate the support and carry it with the loaves out of the oven.

The method has for a further object the subjecting of substantially the entire outer surface of the loaf to the same heat and vapor conditions when introduced into the oven and in subjecting substantially the entire bottom of the loaf, while still supported, to the direct heat of the hearth during the baking operation.

In the baking of hearth bread, some times known as "Vienna" bread or rolls, it is necessary that the loaf or roll when formed be subjected to the direct heat of the hearth, and in the present method of baking, the loaf or rolls when formed are first placed on cloth or in boxes and thereafter placed upon a peel to be inserted into the oven, and when inserted, the peel is quickly removed from beneath the loaf or roll to deposit the same upon the hearth. This, in many instances, results in a jar or shock to the dough which sometimes spoils the consistency of the same, and causes a falling of the bread. In addition, when the finished product is to be removed, the peel must be inserted beneath the bread, which often causes injury to the loaf by the striking of the peel against the same or by causing one loaf to strike against another. In carrying out the baking of the bread by my process, these objections are avoided, and an even product is obtained.

In carrying out my novel method of baking hearth bread, I have illustrated in the accompanying drawings one form of apparatus by means of which my method may be practised, and which form has been found in practice to give satisfactory and reliable results, although it is to be understood that the various instrumentalities may be variously arranged and organized.

Figure 1 represents a vertical section on line *x—x* Fig. 2, of an oven by means of which my method may be practised. Fig. 2 represents an end elevation of the same. Fig. 3 represents an enlarged detail of the receiving end of the oven. Fig. 4 represents a top plan view of a form of a container which may be employed, showing the foraminous support for the bread. Fig. 5 represents a sectional view on line *y—y* Fig. 4, on an enlarged scale.

Similar numerals of reference indicate corresponding parts in the figures.

Referring to the drawings:—1 designates the inclosing wall of a baker's oven formed of brick work or like material and which is provided with the longitudinally arranged oven chamber 2. This chamber 2, in the present instance, has communication at one end with the mixing room of a bakery, while at the other end, it is in communication with the bread room, suitable openings 3 and 4 being provided and controlled, respectively, by the doors 5.

The construction above described is an important feature, since thereby it is possible to place the dough to be baked into the oven at one end and deliver it at the other end as a baked product, thus avoiding the confusion and delay incident to feeding and delivering the dough and product at the same end.

6 designates the oven floor or hearth which is formed with an inclined way 7 at each end in order to confine and prevent the escape of heat when one or the other of the doors 5 are open. Longitudinally disposed of the hearth 6 there is a pair of channels 8 which extend a suitable distance below the floor of the oven and serve to receive the supports or beams 9 for a conveyer mechanism which will hereinafter be described. In my preferred construction, there is one beam 9 located in each channel 8 and preferably projecting therefrom at each end in order to seat upon a movable support independent of the oven walls 1. As here shown, the ends of the respective beams 9 are carried by a piston rod 10 having its piston or plunger 11 slidingly mounted within a fixed cylinder 12. The cylinders 12 are connected to and have communication at or near the bottom with a pressure fluid line or pipe 13, control of which is had by means of the valve 14. This valve 14 is preferably of the three-way type to exhaust the line at certain times and is located adjacent the inlet opening 3 or feeding end of the oven and in a position convenient for ready operation. When the valve 14 is open, pressure fluid from a suitable source is simultaneously admitted beneath all of the pistons 11, consequently moving the rods 10 and thereby raising the beams 9, so that the conveyer mechanism may be raised above the floor of the oven.

15 designates suitable posts or standards secured to each beam 9 at certain intervals and preferably of such lengths as to cause the conveyer chain 16 to closely follow the contour of the hearth or oven floor. It will be noted that each standard 15 serves as a journal support for the sprockets 17 which carry the conveyer chains 16 and prevent sagging intermediate the ends thereof. Each standard 15 is also provided with an idler 18 for the return portion of the conveyer while the tension of the said conveyer is maintained by providing an adjustable sprocket 19 for each of the chains, the said sprockets 19 being journaled in blocks 20 mounted in the slots 21 of the standards 22. A stud 23 or the like is threaded into each standard and bears against the respective blocks 20 so that the proper tension is always maintained in both conveyer chains.

24 designates the driving sprocket which receives power from the belt 25 or equivalent means.

26 designates a feed table positioned adjacent the inlet opening 3 and preferably having its supporting surface formed by transversely disposed rolls 27, the spindle or axes of which lie in an inclined plane substantially in alinement with the inclined hearth or oven surface 7, and around said rollers is a belt 28 for carrying the containers. A second table of suitable construction is located adjacent the discharge end of the oven, as shown at 29, if desired.

30 designates the container for the loaves which comprises a foraminous support 31 of any suitable material, such as wire cloth, netting or other porous material, and which support is adapted to be supported upon the chain conveyers to be carried thereby into the oven. As here shown, there are three supports forming a unit, which are connected with a frame 32 by the rods 33 and the supports are spaced apart so that there is sufficient clearance to receive the conveyer and to allow the straps 34 carried by the frame 32 to rest upon the conveyer so that the container will be carried into and through the oven, as will be described.

35 designates a belt shift for bringing the conveyer to rest at certain predetermined times.

It will be understood that any desired heating means for the oven may be employed to accomplish the desired result.

In carrying out my method, the dough is first thoroughly mixed and when properly fermented, is divided and formed into loaves, rolls, or whatever may be the form to be baked. The loaves or rolls so formed are placed directly upon the foraminous support of the container, which is thereupon placed upon the conveyers and carried into the oven. By reason of the foraminous support, substantially the entire outer surface of the loaf or roll is subjected to the same heat and vapor conditions when entering the oven, since substantially the entire bottom of the loaf is exposed through the interstices of the foraminous support. When a container (or a plurality thereof) has been carried into the oven, the container is lowered and deposited upon the hearth of the oven to rest directly upon the same during the baking operation, it being understood that the movement of the conveyers is arrested or stopped for this purpose. As the foraminous support rests directly upon the hearth, substantially the entire bottom of the loaf or roll, while still supported, is subjected to the direct heat of the hearth during the baking operation. At the proper time, the support is elevated and the conveyer carries the same out of the oven.

From the above, it will be understood that I have provided a new and novel method for baking hearth bread, in which I support the loaf or roll from the time the same is formed until the baking is completed, that is while being carried into the oven, during the baking operation and while being carried out of the oven, without disturbing or removing the loaf or roll from the support, thereby avoiding extra handling of the same. I further subject substantially the entire outer surface of the loaf or roll to the same heat and vapor conditions when introduced into the oven, and while still supported, I subject substantially the entire bottom of the loaf to the direct heat of the hearth, without depositing the loaf or roll directly upon the hearth. By reason of supporting the loaf or roll during the entire operation, shocks to the same are avoided, which, in many instances, spoil the bread, and in addition, the striking of one loaf against another is prevented, as well as injury to the loaf which sometimes occurs in the ordinary baking process in which a peel is employed.

The operation of the mechanism shown and described, by means of which my method may be practised, is as follows: The conveyer mechanism is first started by shifting the belt 25 or like driving means. The filled supports are placed in suitable relation with the conveyer chains to be carried thereby into the oven, and if desired, as fast as one set of containers is carried into the oven, another set may follow until the capacity of the oven is reached. When this occurs, the operator shifts the driving means to bring the conveyers to rest, in which position, the containers or foraminous supports are suspended above the hearth or oven floor and are not in contact therewith. During the foregoing operation, pressure fluid is acting on the piston 11, thus holding the conveyer mechanism in raised position. The operator now cuts off the supply of pressure fluid and allows the cylinder 12 to exhaust gradually through the valve 14, whereupon the conveyer mechanism is gently lowered carrying with it the containers until the foraminous supports rest directly upon the oven floor or hearth, so that substantially the entire bottom of the loaf or roll, while still supported, is subjected to the direct heat of the hearth, making possible the baking of the dough in the correct manner, since the bottom is first baked and the heat works upwardly through the dough as it should for the best results. When the baking is completed, pressure fluid is again admitted to the cylinders 12, which elevates the conveyer mechanism, as well as the containers or foraminous supports carried thereby, so that the latter are removed from contact with the oven floor or hearth. The conveyer is again started and carries the containers or the foraminous supports out of the oven, when they may be deposited upon a suitable support or removed from the conveyors, as may be desired.

It will now be apparent that I have devised a novel and useful method of baking hearth bread, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrifising any of its advantages.

Having thus described my invention, what I claim as new and desire to secure by Letters Patent, is:—

1. The method of baking hearth bread, which consists in placing a loaf upon a foraminous support, in subjecting substantially the entire outer surface of the loaf to the heat and vapor conditions in the oven when introduced thereinto, in depositing the support directly upon the hearth to subject substantially the entire bottom of the loaf while still supported to the direct heat of the hearth, in elevating the support, and in removing it from the oven.

2. The method of baking hearth bread which consists in initially subjecting substantially the entire outer surface of a loaf to radiant heat, and in then subjecting substantially the entire bottom of the loaf to direct heat while continuing to subject the sides and top of the loaf to the radiant heat until the loaf is baked.

3. The method of baking hearth bread which consists in automatically conveying the loaf to be baked into an oven to simultaneously subject substantially the outer surface of the loaf to the radiant heat and vapor conditions within the oven, in subjecting substantially the entire bottom of the loaf to the direct heat of the hearth, and in removing the loaf when baked.

4. The method of baking hearth bread which consists in placing the loaf on a support, in conveying the support and loaf into an oven to simultaneously subject substantially the entire outer surface of the loaf to the radiant heat and vapor conditions within the oven, in subjecting substantially the entire bottom of the loaf, on the support, to the direct heat of the hearth, and in removing the support and loaf when baked from the oven.

5. The method of baking hearth bread which consists in placing the loaf on a support, in conveying the support and loaf into an oven to simultaneously subject substantially the entire outer surface of the loaf to the radiant heat and vapor conditions within the oven, in lowering the support upon the hearth to subject substantially the entire bottom of the loaf on the support to the direct heat of the hearth, in elevating the support when the loaf is baked, and in removing the support and loaf from the oven.

6. The method of baking hearth bread which consists in placing the loaf upon a foraminous support, conveying the support with the loaf thereon into an oven, depositing the support directly upon the hearth of the oven to subject substantially the entire bottom of the loaf to the direct heat of the hearth, elevating the support and loaf after the baking is completed, and then removing the support with the baked loaf from the oven.

7. The method of baking hearth bread which consists in placing the loaf upon a foraminous support, automatically conveying the support with the loaf thereon into an oven, depositing the support directly upon the hearth of the oven to subject substantially the entire bottom of the loaf to the direct heat of the hearth, elevating the support and loaf after the baking is completed, and then removing the support with the baked loaf from the oven.

8. The method of baking hearth bread which consists in placing the dough upon a support, conveying the support with the loaf thereon into an oven, to simultaneously subject substantially the entire outer surface of the loaf to the radiant heat and vapor conditions within the oven, in depositing the support directly upon the hearth until the loaf is baked, and in carrying the support and loaf from the oven.

9. The method of baking hearth bread which consists in placing the dough upon a support, conveying the support with the loaf thereon into an oven to simultaneously subject substantially the entire outer surface of the loaf to the radiant heat and vapor conditions within the oven, in lowering the support and depositing it directly upon the hearth to subject substantially the entire bottom of the loaf to the direct heat of the hearth during the baking operation, in elevating the support and loaf when baked, and in removing the support and loaf from the oven.

10. The method of baking hearth bread, which consists in depositing a loaf upon a support, in automatically conveying the support and loaf into an oven, to subject substantially the entire outer surface of the loaf to radiant heat, in lowering the support and depositing it to rest directly upon the hearth of the oven during the baking operation, in elevating the support when the baking is completed, and in automatically conveying it from the oven.

HUGO GOTTSCHALK.

Witnesses:
C. D. McVay,
K. M. Brophy.